United States Patent [19]

Roulot

[11] Patent Number: 4,556,290

[45] Date of Patent: Dec. 3, 1985

[54] LIGHT SOURCE WITH ACOUSTO-OPTIC DEFLECTOR AND AFOCAL LENS SYSTEM

[76] Inventor: Maurice Roulot, 144 Boulevard de la Terrasse, 91400 Orsay, France

[21] Appl. No.: 385,196

[22] Filed: Jun. 4, 1982

[30] Foreign Application Priority Data

Jun. 4, 1981 [FR] France ............................ 81 11049

[51] Int. Cl.⁴ .............................................. G02F 1/11
[52] U.S. Cl. ....................................... 350/358; 350/453
[58] Field of Search ................................. 350/358, 453

[56] References Cited

U.S. PATENT DOCUMENTS 2,155,659  4/1939  Jeffree ................................ 350/358
4,150,880  4/1979  Howe et al. ....................... 350/358

Primary Examiner—John K. Corbin
Assistant Examiner—Vincent J. Lemmo
Attorney, Agent, or Firm—Sughrue, Mion, Zinn, Macpeak & Seas

[57] ABSTRACT

The light source comprises a light emitter (31) which emits a plurality of beams of light (32) of different colors, a deflector (33) which receives said plurality of different color beams and which deflects them through angles Oi which are a function both of an input control signal (36) and of the wavelength of the light being deflected. An optical system (37) receives said divergent beams of different colors and focuses them to a single point (39). Said point can be used to trace lines on a screen under the control of the control signal to the deflector, and the optical system avoids color fringing.

2 Claims, 4 Drawing Figures

LIGHT SOURCE WITH ACOUSTO-OPTIC DEFLECTOR AND AFOCAL LENS SYSTEM

The present invention relates to light sources, and more particularly to those which are capable of delivering a beam which can be deflected to point in predetermined directions.

BACKGROUND OF THE INVENTION

Such sources already exist which essentially comprise a laser generator in association with an electro-acoustic deflector disposed at the outlet from the laser generator and controlled, for example, by a frequency source which delivers a control signal in the form of ultrasonic waves to the electro-acoustic deflector. Such sources are capable of deflecting the outlet beam by predetermined angles. However, it is known that laser generators are not perfectly monochromatic, ie. they deliver a beam that is composed of a plurality of beams of differing wavelengths, eg. red, blue, and green.

Further, it is well known that the angle through which deflectors such as the one mentioned above deflect beams of light depends on the wavelength of the light in addition to the control signal applied to the deflector.

Consequently, when such a deflector is disposed at the outlet from such a laser generator, it delivers a plurality of beams propagating in different directions. In other words, it acts somewhat like a variable angle prism.

It will thus be readily understood that, by virtue of the beam being decomposed, there are some applications for which such sources cannot be used because the decomposition of the beam detracts from the desired result.

At present such sources are in use in applications as varied as aeronautics, advertising, and civil engineering. In particular they are used to write words or pictures in light on screens of all kinds.

Thus, to properly trace such curves, it is essential to eliminate all wavelengths bar one to ensure that the curve is composed of one line only.

To eliminate the unwanted wavelengths, devices such as prisms or interference filters are used in various light sources.

It will be understood that eliminating the majority of these beams while leaving just one remaining beam has the undoubted effect of reducing the power available in the beam coming from the outlet of the deflector. This means that currently available sources cannot be used in all applications at high efficiency.

Preferred embodiments of the present invention provide a pointable light source including an emitter of light and capable of making use of all the emitted light with minimal power loss, thereby making the source useable in any application and at noticeably higher efficiency than light sources which are currently commercially available.

SUMMARY OF THE INVENTION

The present invention provides a light source comprising:

an emitter of light which, when in operation, emits a beam of light composed of a plurality of different wavelengths $\lambda_1, \lambda_2, \ldots$;

a controllable light deflector having a control input, a light inlet surface disposed to receive the light beam from said emitter, and a light outlet surface from which said light beam propagates in a plurality of beams after deflection through respective angles $\theta_i$ which are a function both of a control signal applied to said control input and of the wavelength of each deflected beam; and an optical system having an inlet surface disposed to receive said deflected beams from the deflector, said optical system serving to focus said beams substantially to a single point, with said beams leaving the optical system at angles $\theta_s$.

Preferably, said optical system is a centred optical system and is made from highly dispersive substance.

Said optical system may comprise an assembly of two lenses arranged in an afocal system.

BRIEF DESCRIPTION OF THE DRAWINGS

An embodiment of the invention is described by way of example with reference to the accompanying drawings, in which.

MORE DETAILED DESCRIPTION

Figure 1:
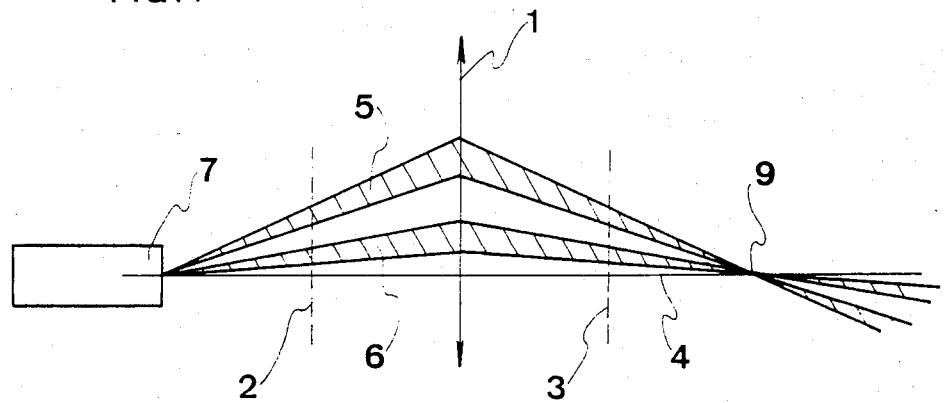
FIGS. 1 and 2 are optical diagrams to give a clear understanding of the prior art.

FIG. 1 shows an optical system comprising a converging lens 1 having an optical axis 4 and two focal planes 2 and 3.

A light source 7 is disposed on the optical axis 4 to emit light at a wavelength $\lambda$. It emits two different beams 5 and 6 propagating in different directions through the lens 1 which produces a real image at a point 9 along the optical axis 4 by bringing both of the beams 5 and 6 into focus together.

Such single point focussing is only possible if the light source 7 emits monochromatic radiation. Under these conditions a converging lens will give a single image point.

Figure 2:
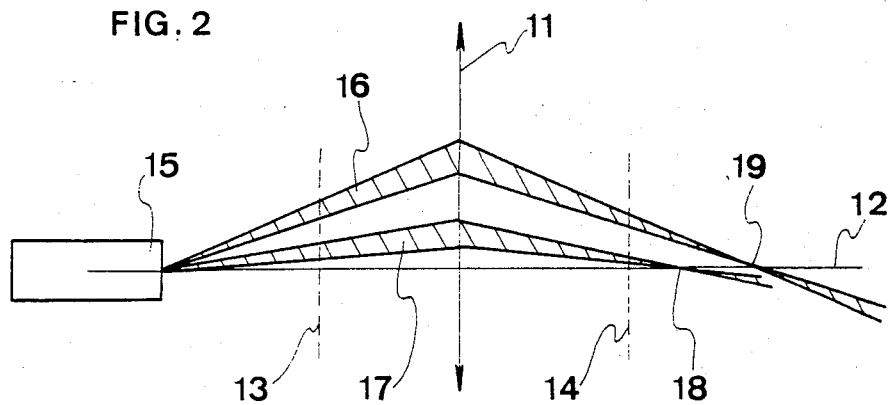

However, as can be seen in FIG. 2, a different result obtains when a light source 15 emits two beams 16 and 17 of different wavelengths $\lambda_1$ and $\lambda_2$. These beams pass through a converging lens 11 having an optical axis 12 and two focal planes 13 and 14, to produce two different image points 18 and 19 along the optical axis 12. Because of the different wavelengths the image points are not coincident.

It will thus be seen, that after passing through the lens 11, a single beam emitted by the light source 15 in various possible directions, will emerge from the lens 11 as a plurality of beams propagating in different directions as a function of their different wavelengths. Further, and in general, the emitted beams diverge in a solid angle which is a function of the difference between the extreme wavelengths.

It can thus be seen that to obtain diffferent directions at the outlet from a centred optical system from which a single beam is required, it is necessary to use a monochromatic source.

Figure 3:
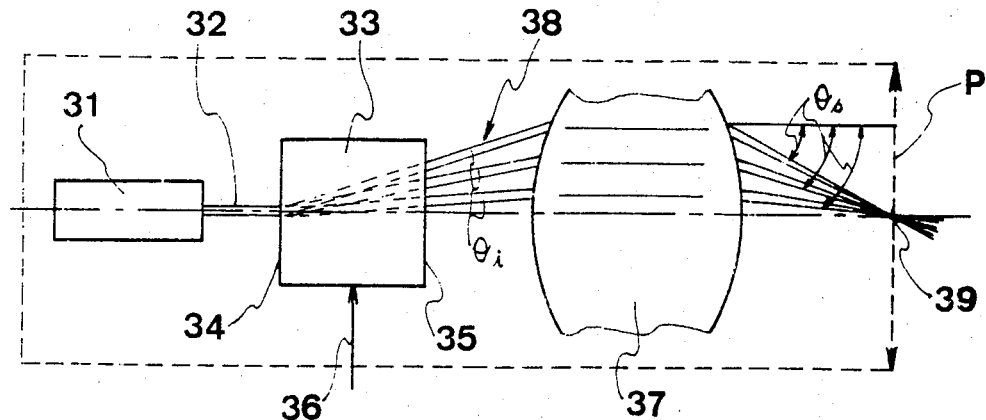
FIG. 3 is a theoretical diagram of a light source in accordance with the invention.

Reference is now made to FIG. 3, which is a diagram of a theoretical embodiment of the invention showing a light source emitting beams that can be pointed by a pre-determined control signal, regardless of whether the beam is monochromatic or not.

In particular, the source comprises an emitter 31 emitting a light beam 32 which may be composed of a plurality of different wavelengths: eg. $\lambda 1$, $\lambda 2$, and $\lambda 3$ representing the colors blue, green, and red.

A controllable deflector 33 has an inlet 34 disposed to receive the light beam 32 from the emitter 31.

At its outlet 35, the deflector 33 provides a plurality of deflected beams 38 as a function of a deflection control signal applied to an input 36. The resulting deflections $\theta i$ are also a function of the different wavelengths in the incident beam 32 at the inlet 34. The source includes a centred optical system 37 disposed at the outlet from the deflector 33 to focus the all different wavelength beams 38 from the deflector 33 to a single point 39 independently from the previously mentioned deflection angles $\theta i$, by applying suitable deflection angles $\theta s$ thereto. The point 39 can then be scanned over a predetermined range, eg. a surface "P", under the control of the instruction applied to the input 36.

Figure 4:
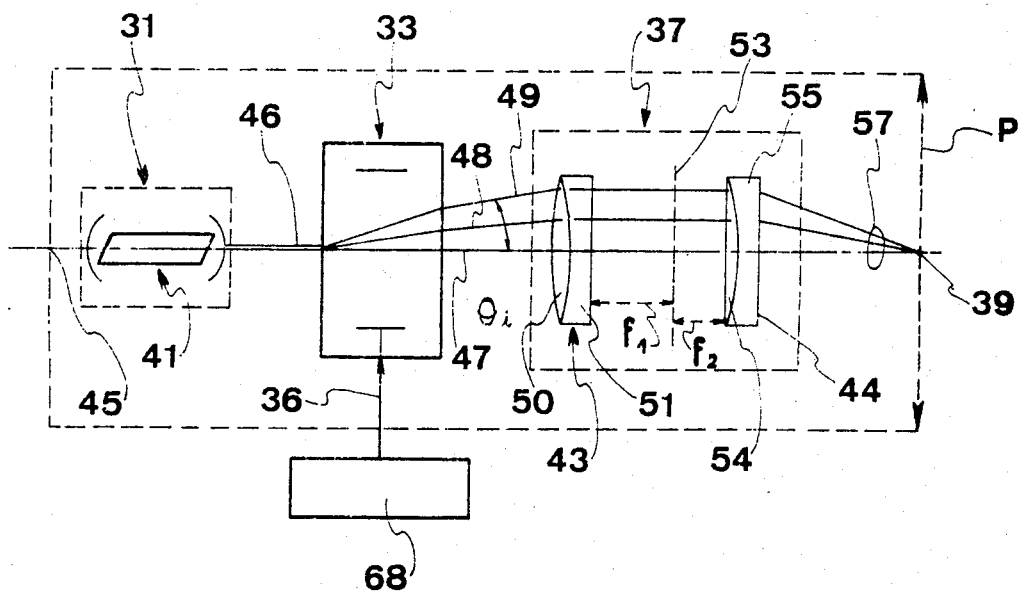
FIG. 4 is a diagram of a practical embodiment of the invention, implementing the diagram of FIG. 3.

Reference is now made to FIG. 4 which shows an embodiment of the invention in which the emitter 31 is constituted by a laser generator 41, eg. a krypton laser known per se, and comprising a discharge tube filled with krypton and disposed in an optical resonant cavity. The laser generator 41 emits a beam 46 which, as is known, comprises three spectrum lines: blue, green, and red.

A deflector 33 is disposed at the outlet from the laser generator 41. The deflector comprises an electro-acoustic deflector known per se and controlled via a control input by a frequency generator 68. The beam 46 passes through the deflector 33 to emerge as three deflected outlet beams 47, 48 and 49 at respective different angles $\theta i$ to the optical axis 45.

The deflection provided by such a deflector is a function of the wavelength of the deflected light and of the frequency applied to its control input.

In particular, such a deflector deflects light by an angle $\theta$ given by a relationship having the form:

$$\theta = (\lambda_0 F)/v$$

where $\lambda_0$ is the wavelength of the light, F is the acoustic frequency applied to the deflector, and v is the speed of the acoustic wave.

The three beams 47, 48, and 49 are received by the centred optical system 37 which is constituted by two lenses 43 and 44 disposed as an afocal system with a common plane 53.

In one embodiment the first lens 43 comprises a converging lens 50 associated with a diverging lens 51. The second lens 44 is also constituted by a pair of lenses: a diverging lens 54 in association with a converging lens 55.

By way of a specific example for obtaining a single light spot 39 from the three red, green, and blue light beams, these lenses are made respectively as follows: lenses 51 and 54 are made form a substance such as PbMO$_4$ having a refractive index of about 2.5; while lenses 50 and 55 are made from a substance known as LaKN13 or LaK21 whose refractive indices are about 1.7.

Further, the applicant has observed, that to focus said three beams to a single point 39, the substances used need to have high dispersive power, ie. to have very large variations in refractive index as a function of wavelength.

Thus, the first substance of index 2.5 has an index for which the variation $d\lambda$ is equal to $-0.033$, and the second substance of index 1.7 has an index for which the variation $d\lambda$ is equal to $-0.0029$. With such dispersive substances, the system remains afocal regardless of the wavelengths passing through.

By way of example, for an argon laser generator, the afocal system comprised a first lens 43 of focal length 45.6 mm, and a second lens 44 of focal length 23.8 mm.

The applicant has observed that the desired results are obtained when the following conditions are satisfied:

$$\theta s(F,\lambda) = K.\theta i(F,\lambda)$$

where K is a constant depending on the response of the optical system. Thus the condition to be satisfied reduces to:

$$\partial \theta s / \partial \lambda = 0$$

This condition can be satisfied, as mentioned above, by two highly dispersive lenses designed to meet the above mentioned condition.

For an afocal system, the structural condition for composing the two lenses obtains when the focal lengths and the variations thereof as a function of the wavelengths of the beams used satisfy the following relationships:

$$df_1 = -df_2 = \frac{f_1 f_2}{f_1 + f_2} \frac{d\lambda}{\lambda}$$

Using the example given above, the relationships are almost perfectly satisfied since the absolute values of $df_1$ and $df_2$ are equal to within 5 or 6%.

In an embodiment which minimises geometrical aberrations, the light source further includes a second or intermediate optical system disposed in between the deflector 33 and the main optical system 37. The second optical system is non-dispersive and is arranged to form the image of the deflector substantially one the inlet face to the optical system 37, ie. on the free face of the lens 50 of the embodiment shown in FIG. 4.

The applicant has observed that good results are obtained if the angular magnification M of the intermediate optical system is substantially equal to:

$$M = \sqrt{\frac{rf_2 v_{ac}}{f_1(f_1 + f_2)\lambda F}}$$

where:

r is the radius of the light beam 46; and $v_{ac}$ is the speed of the acoustic wave in the deflector cell.

Finally, in another advantageous embodiment of the invention, the light source includes an optical prism disposed upstream (relative to the direction of propagation of the light beam) from the main optical system 37 and disposed in its minimum deflection position. The prism can then converge the beams leaving the deflector in the vicinity of the periphery of the lenses, thereby avoiding use of said periphery of the inlet face, since the outer edges of such lenses always give rise to spherical aberrations for rays which are not parallel to the axis.

The advantage of such a light source can thus be seen in that it provides a point of light 39 which can be directed to any point on the surface P by applying suitable X and Y control signals to the deflector 33.

Naturally the deflector may be controlled by any suitably programmed electronic means, eg. pre-programmed to trace various curves with the point of light, the word "curve" being taken in its widest sense.

Further, it is clear that the present invention can be used with a generator of light that emits composite light beams including a plurality of spectral colors to obtain a single point of light which could be used as a light source. This advantage can be seen clearly by looking at FIG. 2 which shows that it was not previously possible use a generator of polychromatic light to obtain a single point of light in which all the colors are combined.

Finally, the invention makes it possible to obtain the advantages of the system shown in FIG. 1 where all the light beams converge on a single point, without having to use a monochromatic generator as shown in FIG. 1. Thus, a source in accordance with the present invention makes use of substantially all the light power emitted by a generator of polychromatic light. This is in marked contrast with the normal situation where energy emitted at wavelengths other than a chosen wavelength is removed from a beam which thus retains only a single spectrum line, and hence only a fraction of the original light energy.

I claim:

1. A light source comprising:

an emitter of light, which, when in operation, emits a beam of light composed of a plurality of different wavelengths $\lambda_1, \lambda_2, \ldots$ a controllable acousto-optic light deflector having a control input, a light inlet surface disposed to receive the light beam from said emitter and a light outlet surface from which said light beam propagates as a plurality of beams after deflection through respective angles $\theta_i$ which are a function both of a control signal applied to said control input and of the wavelength of each deflected beam, an optical system having an inlet surface disposed to receive said deflected beams from the defelctor, said optical system serving to focus said beams substantially to a single point, with said beams leaving the optical system at angles $\theta_s$, said optical system being made from highly dispersive substances and comprising two lens components mounted as an afocal system having focal lengths $f_1$ and $f_2$ respectively varying with the light wavelength in accordance with the relationships:

$$df_1 = -df_2 = \frac{f_1 \cdot f_2}{f_1 + f_2} \frac{d\lambda}{\lambda}$$

2. The light source as claimed in claim 1, wherein said optical system is designed in such manner that the outlet angles vary with variation in light wavelength substantially in accordance with the relationship:

$(\partial\theta\lambda/\partial\lambda)=0$.

* * * * *